United States Patent [19]
Tulkoff

[11] 3,723,708
[45] Mar. 27, 1973

[54] APPARATUS FOR HEAT SHRINKING MATERIAL ABOUT LOADED PALLET

[76] Inventor: Martin J. Tulkoff, 1010-1042 E. Lombard St., Baltimore, Md. 21202

[22] Filed: May 18, 1972

[21] Appl. No.: 254,548

[52] U.S. Cl. ............... 219/385, 53/184, 219/349, 219/352, 219/388, 219/535
[51] Int. Cl. .......................................... F27d 11/02
[58] Field of Search......219/352, 349, 388, 385, 521, 219/535; 174/50.51; 29/447; 53/30, 184; 34/212, 222

[56] References Cited

UNITED STATES PATENTS

| | | | |
|---|---|---|---|
| 2,729,733 | 1/1956 | Heron | 219/535 |
| 2,963,567 | 12/1960 | Roth | 219/521 X |
| 3,156,812 | 11/1964 | Forman et al. | 219/388 |
| 3,239,651 | 3/1966 | Silberman | 219/388 |
| 3,283,469 | 11/1966 | McBrady et al. | 53/184 X |
| 3,312,811 | 4/1967 | Shanklin | 219/388 |
| 3,581,458 | 6/1971 | Gustavsson | 53/30 |
| 3,589,102 | 6/1971 | Zelnick | 53/184 |
| 3,662,512 | 5/1972 | Zelnick | 53/30 |
| 2,848,591 | 9/1958 | Taylor | 219/352 |
| 3,012,125 | 12/1961 | Woolhouse | 219/385 |

Primary Examiner—Volodymr Y. Mayewsky
Attorney—Eric P. Schellin et al.

[57] ABSTRACT

A device for heat shrinking a loaded pallet having a bag of heat shrinkable plastic film. The device includes a housing which is closed at its sides and top but is open at the bottom. Along the internal walls are positioned heating elements which consume only a moderate amount of electric energy. The housing is suitably insulated to conserve heat and thereby reduce electric energy requirements. The housing has means associated therewith to permit its being raised and lowered; so that in non-use the housing is raised into an out-of-the-way position.

6 Claims, 6 Drawing Figures

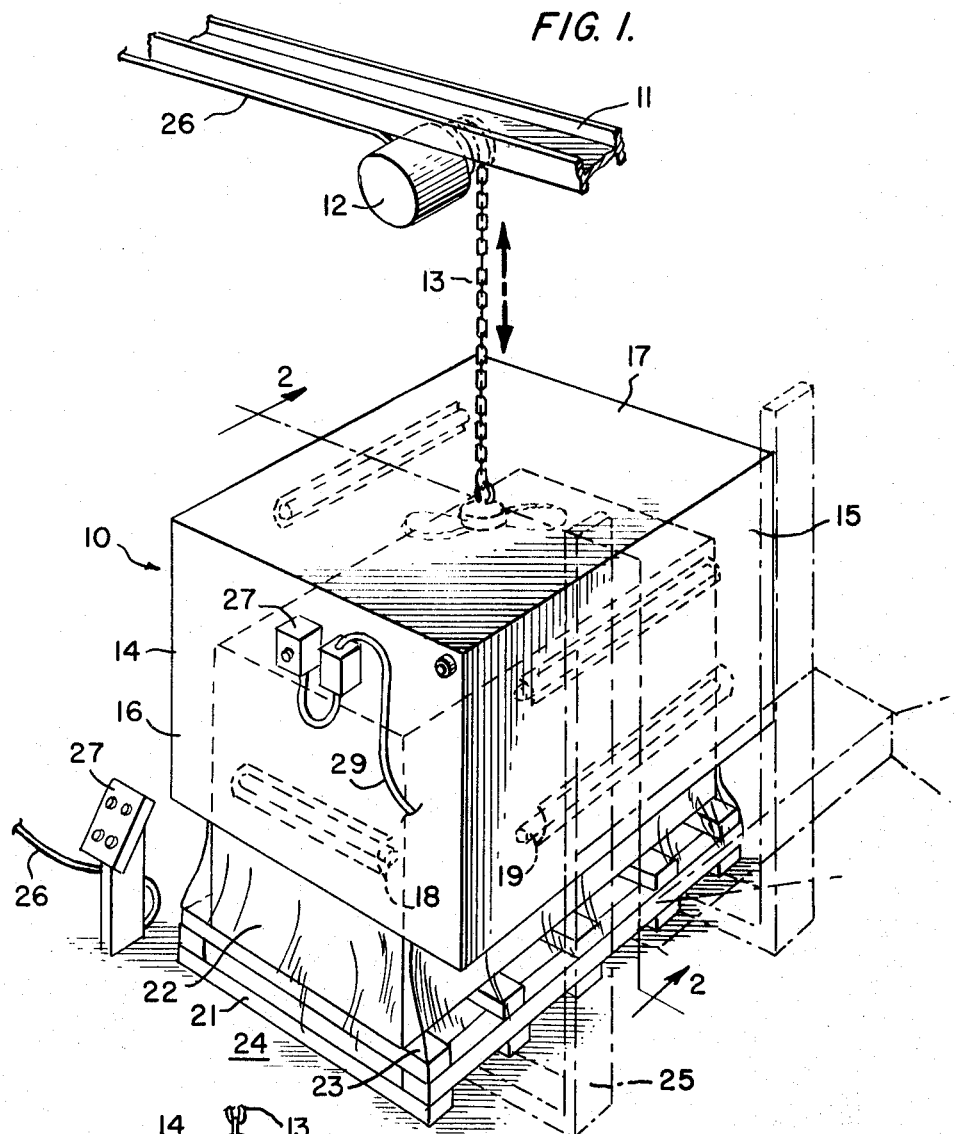
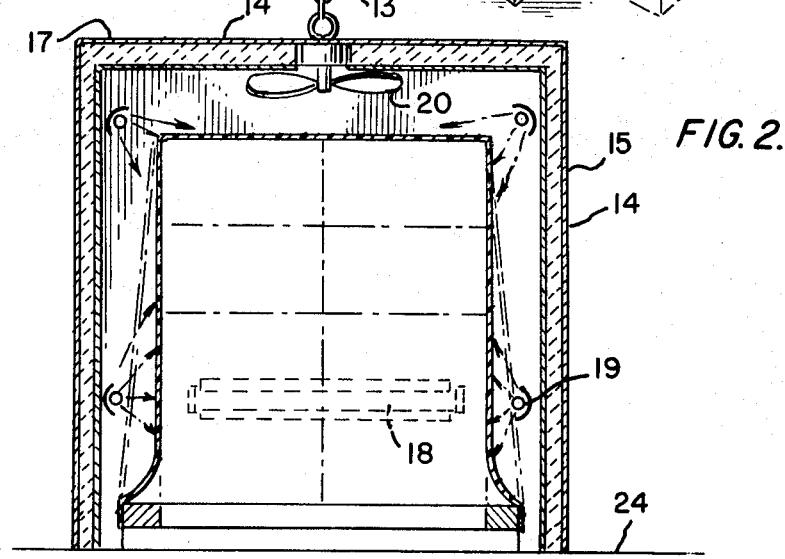

3,723,708

APPARATUS FOR HEAT SHRINKING MATERIAL ABOUT LOADED PALLET

BACKGROUND OF THE INVENTION

This invention relates to a device for the handling of goods stored on a supporting pallet, and particularly to a device for heating a loaded pallet wherein the goods thereon have been enveloped by a substantially conforming plastic film.

It is common practice to store and otherwise handle stacks of goods while supported on pallets. When the pallets are to be kept outdoors or are otherwise surrounded by an atmosphere which may damage the stacked material, plastic covers have been employed heretofore for protecting the stored goods.

It is also known to protect stored goods by enclosing the goods in loosely fitting bags of heat-shrinkable plastic film, which is a staple article of commerce, and then to expose the bags to heat sufficient to cause shrinkage of the bags into conforming engagement with the goods. This method has been employed heretofore for securing several stored objects in a fixed spatial relationship by a common envelope of shrunken film. The exposure to heat is usually accomplished by what is known as a heat tunnel which is provided with a conveyor means to move the loaded pallet into the tunnel at one end thereof and to move it out at an opposite end. The dwell time in the tunnel is controlled by the speed of the conveyor. In such prior art devices, the electric energy consumption is of a very high magnitude. This is due to the fact that the heating elements are operated intermittently so that heat output is chiefly by direct radiation.

In other prior art devices, the enclosed loaded pallet is heated only in certain areas at a time. Such heating is accomplished by blasting the areas with a stream of hot air.

SUMMARY OF THE INVENTION

The device of the present invention includes advantageously a rectangularly-shaped housing having closed end walls, side walls and top. The housing has an open bottom. The housing has mounted internally along the lower portion of each wall an elongated horizontally disposed electric heating element. The elements are of sufficient length to have a dimension which is at least as long as a major horizontal dimension of the wall to which it is affixed. The side walls also possess elongated horizontally disposed electric heating elements along the upper portion of each side wall. To provide directed heat radiation each of the heating elements are spaced from their respective walls and are provided with reflectors which direct the radiation produced in the most efficacious even manner without ballooning of the plastic.

The housing is suspended from a suitable means as from a beam in the ceiling when the housing is not in use. When it is in use the housing may rest on its downwardly facing leading edge on the floor or the like and still maintain the temperature needed.

In use the goods which may be in boxes are supported on an upwardly directed face of a pallet. At least a major portion of the goods are covered with a bag of heat shrinkable plastic film substantially conforming to the goods and to part of the pallet if the bag is sufficiently large for this purpose. The application of the bag is simply carried out by employing a bag of heat shrinkable plastic film having an open bottom end and a rim portion about the opening in the bottom end which is pulled downward over the goods and a portion of the pallet.

The bag may be applied to the pallet at a position remote from the housing and then transported to a position so that it resides directly underneath the housing which has been positioned in a raised condition without danger of burning oneself. The transportation may be conveniently carried out with a forklift truck or any other convenient mode. On the other hand, the bag may be applied to the goods on the pallet while it is already in position underneath the housing.

Once the loaded pallet has been properly encased and positioned beneath the housing, the preheated housing is lowered over the so-enclosed loaded pallet. The housing may be suspended as by a chain hoist, for instance. Suitable switch controlling means senses the fact that the housing has completed its descent. A timer which has been preset to control the dwell time of the enclosed loaded pallet is advantageously employed. At the conclusion of the heat shrinking step, the housing is raised to permit ready access to the loaded pallet which may be removed by conventional means.

BRIEF DESCRIPTION OF THE DRAWINGS

In the drawings:

FIG. 1 is a perspective view of the device of the present invention with a bag enclosed loaded pallet partially encompassed by the housing;

FIG. 2 is a cross-sectional view of the housing taken along lines 2—2 of FIG. 1;

DETAILED DESCRIPTION OF THE INVENTION

Figure 3:
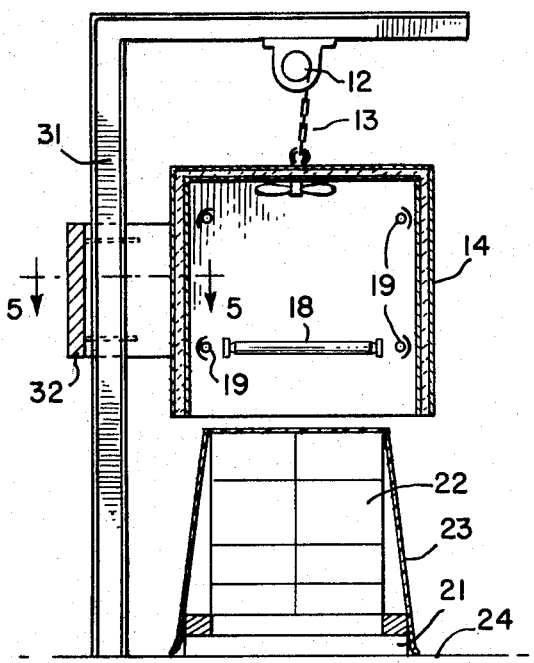
FIG. 3 is a cross-sectional view of the device of another embodiment with the housing in the ascended position.

Turning to the drawings, especially to FIG. 1, reference numeral 10 is to the device of the present invention. Suspended from a beam 11, for instance, is a chain hoist 12 having a chain 13. To the end of the chain is attached a housing 14, which is an oven.

For a more detailed consideration of the housing, FIG. 1 should be considered with FIG. 2. The housing has side walls 15 and end walls 16. A top 17 completes the housing. It does not possess a bottom as this would defeat its unique utilizability. The walls and top are constructed of sheet metal, for instance. Preferably the construction as clearly shown in FIG. 2, is of the sandwich type with outer and inner lamina of sheet metal and a core of suitable insulation material, such as asbestos.

Inside each of the inner end walls 16 is an elongated electric heating element 18, shown by dotted lines. The element 18 is positioned along the lower portion of the wall. The longest dimension of the heating element is such that it bridges a major portion of the width of the end wall. Further, inside each of the side walls 15 are two elongated electric heating elements 19 shown by dotted lines in FIG. 1 and in cross section in FIG. 2. Two of the heating elements 19 are positioned in approximately the same horizontal plane as the heating elements 18 of the end walls 16. Each of the other heating elements are secured to the inner side wall at the upper portion thereof. The heating elements 19 on each side wall are parallel to one another. Additionally, they are of a length so that each bridges a major portion of the width of the side wall 15.

Secured to the underside of the top 17, which constitutes the ceiling of the housing 14 is downwardly facing fan 20, designed to project a stream of air downwardly. This fan 20 is electrically driven by suitable means such as an electric motor, for instance (not shown).

From FIG. 1 it will be seen that a pallet 21 having a load 22 thereon with a heat shrinkable bag 23 positioned over the load has been located on the floor 24 by a forklift means 25, shown in fragmentary form. The housing 14 is lowered over the loaded pallet by operation of the electrically operated hoist 12. The hoist is electrically connected by means of electric conduit 26 (shown in a broken manner) to a control station 27 having suitable electric switches for starting and stopping the operation of the hoist 12. The electric hoist has suitable sensing switches designed to stop the operation when the housing is in its uppermost raised position and when it has come to its lowermost position, that is when it has come to rest on the floor 24 for instance. Switches are also at the control station for reversing the movement of the housing either at the end of the uppermost position or at the lowermost position or at any intermediate position. Additionally, the control station possesses a selective timer device whereby the period of time when the housing is in the lowermost position can be controlled by presetting the time. The control station 27 could be hung from the ceiling for instance and brought to a level whereby the forklift operator could operate the control station without dismounting.

In operation the electric heating elements are activated at a time sufficiently prior to utilization. The heating elements advantageously employ low electric energy requirements of between 8 and 20 KW, preferably 10.6 KW. In view thereof, it is desirable to preheat the housing to an ambient temperature of approximately 250°F. A thermostatically operated switch 28 is located in the housing to control a desirable preselected temperature level. The electricity is supplied to the heating elements by a flexible conduit 29 shown in fragmentary form.

In FIG. 1 the housing is shown in partial ascent or descent. However, in FIG. 2, the housing has descended so that it rests on the floor 24 thereby completely enclosing the loaded pallet. It has been found that with a preset temperature of about 250°F, and heating elements drawing about 10.6 KW, a dwell time of 3 to 5 minutes is sufficient to bring the heat shrinkable bag to a temperature which enables it to be shrunk tightly about the load. The dwell time will be at the upper period of time when the loaded pallet contains a load of refrigerated goods.

The fan 20 is designed to ensure good distribution of heat by providing a downward draft about the loaded pallet. It will be seen that the housing is of sufficient size to permit spacing of the housing about the loaded pallet.

Figure 4:
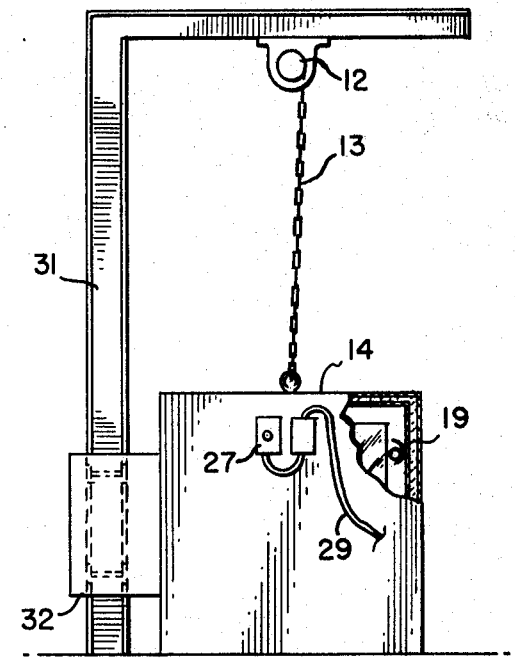
FIG. 4 is a side elevational view of the embodiment of FIG. 4 with part of the housing broken away and the housing is in its lowermost position.
Figure 5:
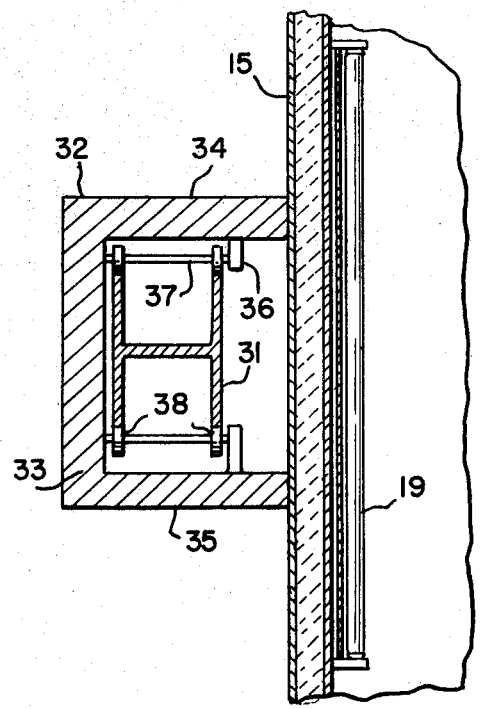
FIG. 5 is a cross-sectional view taken along line 5—5 of FIG. 3.

Now, turning to FIGS. 3–5, attention is directed to another embodiment. Structurally, the housing 14 is identical to that discussed in the above. However, for greater assurance that the housing 14 descends in the exact same vertical plane on every occasion, vertical guide upright 31 is provided. The upright is seen to be an I-beam which may also structurally help to support the ceiling of a building. A carriage 32 is designed to ride on the four leading edges of the support as can be seen from FIG. 5. With regard thereto the carriage 32 has, generally, a U-shaped frame 33 with the end portion of the legs 34 and 35 secured, as by welding, for instance, to a side wall 15 of the housing 14. The inner portions of the legs 34 and 35 have extension means 36 which have journalling means for one end of an axle 37. The other end is suitably journalled at the apex portion of the frame. The axles 37 have journalled thereon wheels 38 which are adapted to ride on the edges of the upright 31. By accurately controlling the movement of the housing 14, suitable markings may be made on the floor to delineate the area in which the pallet is to be positioned. Several color coded markings may be made to accommodate various sizes of pallets.

FIG. 3 illustrates the housing 14 in a raised position over a positioned pallet having a heat shrinkable bag pulled over the loaded pallet; the load being a plurality of boxes. In FIG. 4 the housing has been lowered and the loaded pallet is being subjected to heat treatment.

Figure 6:
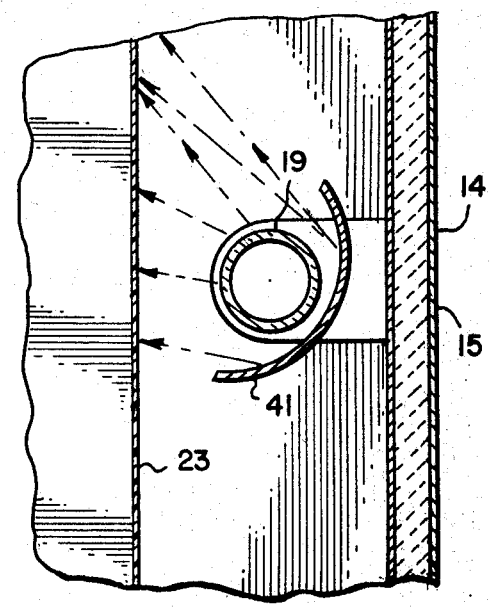
FIG. 6 is a cross-sectional view through a fragmentary portion of one wall of the housing.

FIG. 6 shows an enlarged cross-sectional view of the housing with the heating element to show the concave heat reflector 41 therebehind. The heat reflector 41 is constructed of an elongated concave sheet metal and is positioned to direct the reflected heat rays in a general upward direction in the direction of the bag 23, as shown. With regard to the heating elements secured to the upper portion of the side walls 15, the reflectors are positioned to direct the rays in a somewhat downward direction. It will be seen that the reflectors are located between the heating elements and the walls of the housing.

In the foregoing consideration of the invention, it should be appreciated that a great many advantages flow from the invention, some of which bear listing such as:

a. vertical operation of the housing
 b. closed housing except for the bottom to confine heat
 c. low energy requirements
 d. adjustability for
   1. dwell time
   2. temperature conditions
 e. automatic timing operation
 f. no floor space required
 g. heat shrinkable bag may be applied to the loaded pallet either in position or remote from the housing prior to transporting it thereto
 h. no need for adjustment of size of load as in prior art devices
 i. temperature control features are mounted directly on the housing j. no need for air curtains or vacuum to insure that heat shrinkable bag is confined tightly to load; downward movement of closed housing over load forces bag into proximity to the load.

What is claimed is:

1. A device for heat shrinking a loaded pallet having a bag of shrinkable plastic film which has been previously pulled over the load comprising a housing; said housing having closed side walls, closed end walls, a closed top and an open bottom; said walls and said top of said housing being insulated said housing having sufficient internal dimensions to enclose a loaded pallet with the inner walls spaced from all the load; said housing being supported substantially centrally from its top by means of flexible means which has one end attached to the top of the housing; electric hoist means positioned above said housing; the other end of said flexible means being attached to said electric hoist means adapted to be selectively wound and unwound thereby, whereby the housing is selectively moved along a vertical plane; first elongated electric heating means positioned horizontally internally with respect to each end wall at the lower portion thereof; said first heating means extending for a major portion of the width of said each end wall; second elongated electric heating means positioned horizontally internally with respect to each side wall at the lower portion thereof; said second heating means extending for a major portion of the width of said each side wall; third elongated electric heating means positioned horizontally internally with respect to each side wall at the upper portion thereof; said third heating means extending for a major portion of the width of said each side wall; elongated concave reflector means positioned behind each of said heating means; each of the reflector means of said first and second heating means adapted to direct reflections therefrom generally upwardly; each of the reflectors of the third heating means adapted to direct reflections therefrom generally downwardly; said electric hoist means having timer means whereby the housing may enclose a loaded pallet for a predetermined period of time; and means for preselecting and controlling the electric energy supplied to said heating means to maintain temperature conditions within said housing within a preselected level.

2. The device of claim 1 wherein all the said heating means require 8–20 KW electric energy.

3. The device of claim 2 wherein all the said heating means require about 10.6 KW electric energy.

4. The device of claim 3 wherein guide means is secured to the side of said housing adapted to ride on an upright support.

5. The device of claim 4 wherein the guide means includes a frame having wheels internally with respect thereto and adapted to ride on the said upright.

6. The device of claim 5 wherein a fan means is positioned centrally internally with respect to the top of said housing adapted to drive ambient air downwardly.

* * * * *